United States Patent
Rutledge et al.

[19]

[11] Patent Number: 6,113,333
[45] Date of Patent: Sep. 5, 2000

[54] APPARATUS AND METHOD FOR APPLYING SEALANT TO A CAN LID

[75] Inventors: Clinton W. Rutledge, Highlands Ranch; Tracy J. Fowler, Lakewood, both of Colo.

[73] Assignee: Preferred Machining Corporation, Englewood, Colo.

[21] Appl. No.: 09/074,678

[22] Filed: May 8, 1998

[51] Int. Cl.[7] .................................................. B21D 51/46
[52] U.S. Cl. ................................................. 413/19; 413/61
[58] Field of Search .............................. 413/20, 19, 18, 413/7, 61, 60, 58

[56] References Cited

U.S. PATENT DOCUMENTS

| | | | |
|---|---|---|---|
| 1,639,118 | 8/1927 | Troyer et al. | 413/61 |
| 1,838,082 | 12/1931 | Coyle | 413/19 X |
| 3,641,959 | 2/1972 | Hurst | 413/19 |
| 4,262,629 | 4/1981 | McConnellogue et al. | 118/668 |
| 4,840,138 | 6/1989 | Stirbis | 118/694 |
| 5,215,587 | 6/1993 | McConnellogue et al. | 118/699 |
| 5,533,853 | 7/1996 | Wu | 413/31 |
| 5,564,877 | 10/1996 | Hamilton | 413/61 |

*Primary Examiner*—James F. Coan
*Attorney, Agent, or Firm*—Klaas, Law, O'Meara & Malkin, P.C.; Joseph J. Kelly, Esq.; Michael A. Goodwin, Esq.

[57] ABSTRACT

Apparatus for applying a sealant to an outer rim of a can lid supported on a rotating lift chuck for movement into and out of a location beneath a sealant applying gun wherein the can lid is held onto the rotating lift chuck during the application of the sealant by at least a partial vacuum. Also, each sealant applying gun is pivotally mounted between a first location blocking the removal of an underneath lift chuck and a second location permitting the removal of the underneath lift chuck.

20 Claims, 4 Drawing Sheets

APPARATUS AND METHOD FOR APPLYING SEALANT TO A CAN LID

FIELD OF THE INVENTION

This invention relates generally to the application of a sealant to the circular outer rim of a can lid and more particularly to the holding of a can lid on a sealant applying apparatus to have the sealant applied thereto and the easy removal of the can lid holding apparatus from the sealant applying apparatus.

BACKGROUND OF THE INVENTION

Apparatus for applying a sealant to the circular outer rim of a can lid is disclosed in U.S. Pat. No. 4,262,629 which is incorporated herein by reference thereto. The apparatus in the '629 patent comprises a star wheel for supplying a can lid to a location on a rotatable turret above a lift chuck. Apparatus is mounted on the rotatable turret to move the lift chuck from a lower position, at which the can lid is placed on the lift chuck, and an upper position, at which a sealant is applied to the circular outer rim of the can lid. The lift chuck rotates with the rotatable turret and also rotates relative to the rotatable turret. As the lift chuck returns to the upper location, the can lid contacts an upper chuck assembly so that the can lid is held securely in position to have the sealant applied thereto by the forces generated thereon by the lift chuck and the upper chuck assembly. After the sealant has been applied to the can lid, the lift chuck moves to the lower position and, during such movement, the can lid with the applied sealant is discharged. U.S. Pat. Nos. 4,840,138 and 5,215,587 disclose improvements to the '629 patent but still require the upper chuck assembly. It is desirable to eliminate the upper chuck assembly because of its costs and weight and also, the upper chuck assembly provides an obstacle to the removal of the lift chuck for servicing.

BRIEF DESCRIPTION OF THE INVENTION

This invention provides apparatus and method for the application of a sealant to the circular outer rim of a can lid wherein the can lid is held on a lift chuck by a partial vacuum during the application of the sealant, so that the upper chuck assembly of a conventional sealant applying apparatus is eliminated. Also, the sealant applying guns are pivotally mounted so that the sealant applying guns may be moved to an inoperative or out of the way location and the lift chuck removed for servicing.

In the apparatus of a preferred embodiment of the invention, the can lid is held on a lift chuck by a partial vacuum during the application of a sealant by a sealant applying gun. The apparatus includes conventional parts such as a rotatable main spindle on which a plurality of circumferentially spaced apart hollow outer casings are mounted for rotation therewith. Each hollow outer casing has spaced apart cam rollers mounted thereon and the cam rollers are in engagement with an annular cam surrounding the main spindle. As the main spindle rotates, the cam rollers follow the cam to move sequentially each outer casing in longitudinal directions between a lower position and an upper position. A hollow housing is removably mounted within each hollow outer casing for rotation therewith and for movement between the lower and upper positions therewith. The hollow housing is connected to the hollow outer casing to prevent relative rotational movement therebetween. A lift chuck is mounted in the hollow housing for rotation therewith and for rotation relative thereto. The lift chuck is rotated by a gear mounted thereon which is driven by a spur gear which is driven by a separate drive so that the rotational speed of the lid may be varied. This differs from the drive in the '629 patent. The lift chuck also moves with the hollow housing between the lower and upper positions and moves through one of a plurality of spaced apart openings in a table that is mounted on the main spindle for rotation therewith.

In a preferred embodiment of the invention, the lift chuck comprises three parts which function to provide the partial vacuum for holding the can lid on the lift chuck during the application of the sealant by the sealant applying gun. The first part is a can lid holding apparatus that has a body portion having a longitudinal axis. The body portion has an inwardly extending first recess formed at one end portion thereof so that the first recess has a generally round first bottom surface which also has an inwardly extending second recess formed therein so that the second recess has a generally round second bottom surface. A passageway extends from the second bottom surface and has an opening at the other end portion of the body portion. A flexible member having a central passageway is mounted on the second bottom portion and has an annular surface located to contact a can lid. The central passageway and the passageway are in alignment so that one end of the combined passageways is exposed to the atmosphere before a can lid is positioned on the flexible member as described below.

The second part comprises a hollow elongated stem portion having a recess formed at one end portion thereof with the recess having a cylindrical sidewall. The other end portion of the first part and the one end portion of the second part are joined together with a fluid tight seal so that the combined passageways in the first part are in fluid communication with the recess in the second part. The other end portion of the hollow elongated stem portion has a gear attached thereto which gear is rotated to rotate the second part relative to the spindle.

The third part comprises an elongated rod portion that is mounted in the hollow elongated stem portion of the first part and has an integral piston at one end portion thereof which piston is in sealing engagement with the cylindrical sidewall. The other end portion of the elongated rod of the third part has a reduced threaded section on which is mounted a threaded nut. A resilient spring is mounted between the other end portion of the hollow elongated stem portion of the second part and the threaded nut to hold the third part from movement in a longitudinal direction as the second part moves in longitudinal directions.

In operation, the main spindle is rotating and is approaching the location whereat a can lid is to be moved by a star wheel onto the table and over one of the plurality of openings so that a lift chuck may be moved into contact therewith. The piston of the lift chuck is in the recess of the second part and is adjacent to the other end portion of the first part. In a continuous operation, a can lid is moved over a rotating lift chuck which is starting to move in an upward longitudinal direction. As the lift chuck moves upwardly, the flexible member moves into contact with the can lid. A guide prevents upward movement of the can lid so that the flexible member moves into sealing engagement with the can lid. At the same time, the second part is moving relative to the third part to start creating a partial vacuum in the recess to hold the can lid on the first part. When the upward movement of the lift chuck stops, a sealant applying gun is actuated to apply a sealant to the outer rim portion of the can lid. After the sealant has been applied, the lift chuck starts to move downwardly. Just before the lift chuck reaches its lower position, the can lid with the sealant applied thereto is transferred to removal apparatus. The lift chuck reaches its lower position and the process is repeated.

In another preferred embodiment of the invention, the sealant applying guns are mounted on the spindle for rotation therewith. The sealant applying guns are pivotally mounted on the spindle so that each sealant applying gun can be moved between an operative position which prevents the removal of a lift chuck and its housing and an inoperative position which permits the removal of a lift chuck and its housing. In a preferred embodiment of the invention, the sealant applying gun immediately above the lift chuck and housing to be removed and the next adjacent sealant applying gun are each pivoted to the inoperative position so that the lift chuck and its housing can be removed.

BRIEF DESCRIPTION OF THE DRAWINGS

An illustrative and presently preferred embodiment of the invention is illustrated in the accompanying drawings in which.

DETAILED DESCRIPTION OF THE INVENTION

Figure 1:
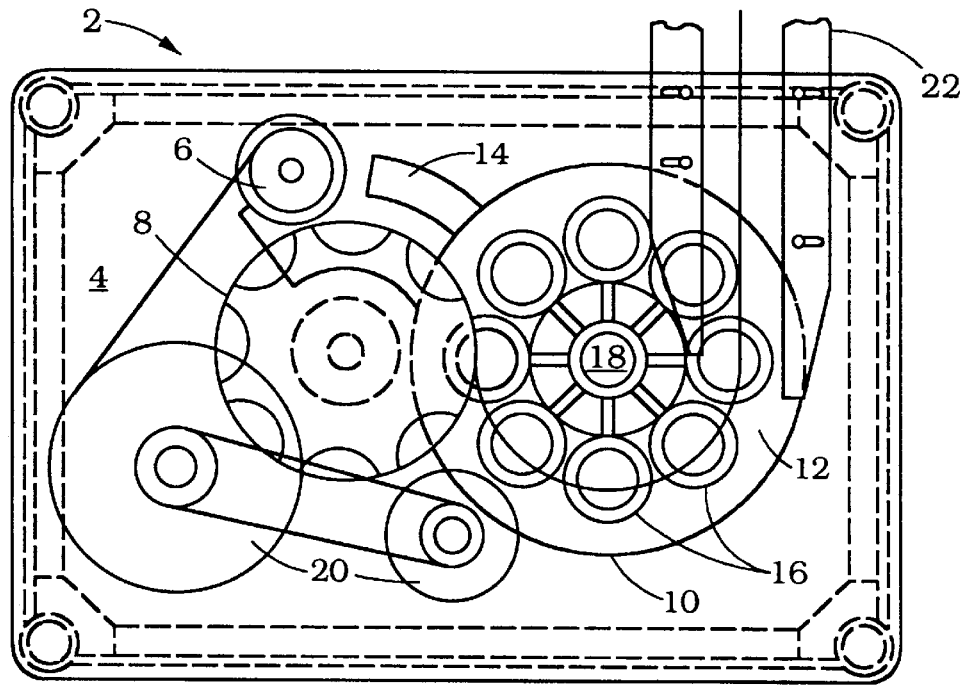
FIG. 1 is a schematic top plan view of prior art apparatus for applying sealant to a can lid.

In FIG. 1, there is illustrated conventional can lid sealant applying apparatus 2 of the type disclosed in the '629 patent. The apparatus 2 has a generally planar surface 4 on which is mounted a supply 6 of can lids. A rotatable star wheel 8 removes a can lid from the supply 6 and moves it over the generally planar surface 4 to a table 10 having a surface 12 which lies generally in the same plane as the surface 4. A guide means 14 cooperates with the star wheel 8 to move can lids in succession over a plurality of spaced apart openings 16 in the table 10 for contact with lift chucks, described below, which move through the openings 16.

A rotatable main spindle 18, the star wheel 8, the feeding of the can lids from the supply 6 and other driven apparatus (described more fully below) are operated by conventional power apparatus 20. The can lids with sealant applied thereto are removed by discharge track means 22.

Figure 9:
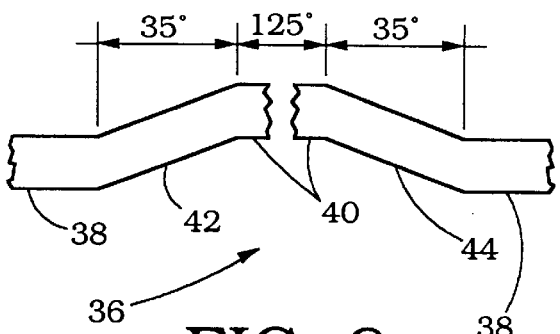
FIG. 9 is a schematic illustration of the cam which functions to raise and lower the lift chuck.

In FIGS. 3, 3A, 4 and 7–9, there is illustrated apparatus for supporting a can lid to have sealant applied to the outer rim thereof. The apparatus has a plurality of outer casings 30 mounted on the main spindle 18 for rotation therewith. Two spaced apart rollers 32 and 34 are mounted on each outer casing 30 and roll over the cam 36. As illustrated in FIG. 9, the cam 36 has a lower portion 38 and an upper portion 40 and two inclined portions 42 and 44 extending between the lower portion 38 and the upper portion 40. The rollers 32 and 34 follow the cam 36 to move the outer casings 30 between a lower non-sealant applying location and an upper sealant applying location.

Figure 7:
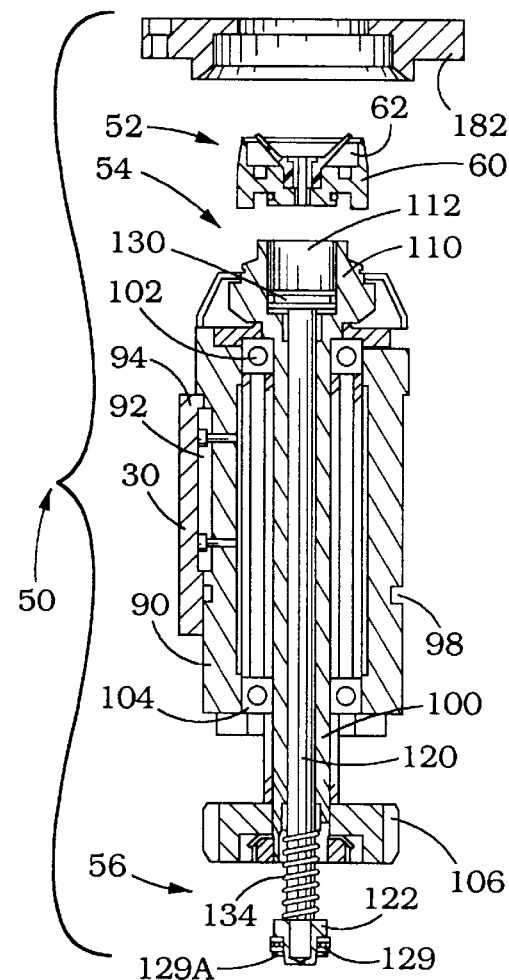
FIG. 7 is an exploded elevational view with parts in section illustrating the parts of the lift chuck of this invention.
Figure 8:
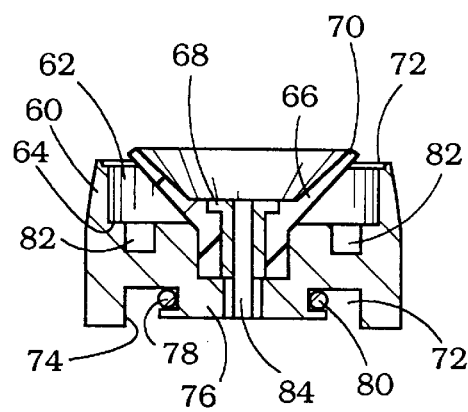
FIG. 8 is an enlarged view of the can lid supporting apparatus of the lift chuck.

A lift chuck 50 is mounted in each outer casing 30 for rotation therewith. As illustrated in FIG. 7, each lift chuck 50 has a first part 52, a second part 54 and a third part 56. The first part 52 supports a can lid 58, FIG. 4, and has a body member 60 having a central recess 62 and a bottom surface 64. A flexible can lid supporting member 66, FIG. 8, is mounted in the recess 62 of the body member 60 by suitable means, such as the threaded bolt 68. The flexible member 66 has an annular lip portion 70 which normally projects slightly above the annular surface 72 of the body member 60 preferably in the amount of about 0.050 inch. The flexible member 66 comprises a conventional suction cup such as that marketed by ANVER Corporation under the trade designation F35-NBR. The body member 60 has a second recess 72 formed therein which has a threaded surface 74. The body member 60 also has a central portion 76 having an annular groove 78 having an O-ring sealing gasket 80 seated therein. Tool engaging recesses 82 are formed in the bottom surface 64. A passageway 84 extends through the bolt 68 and the body member 60.

Figures 3, 3A:
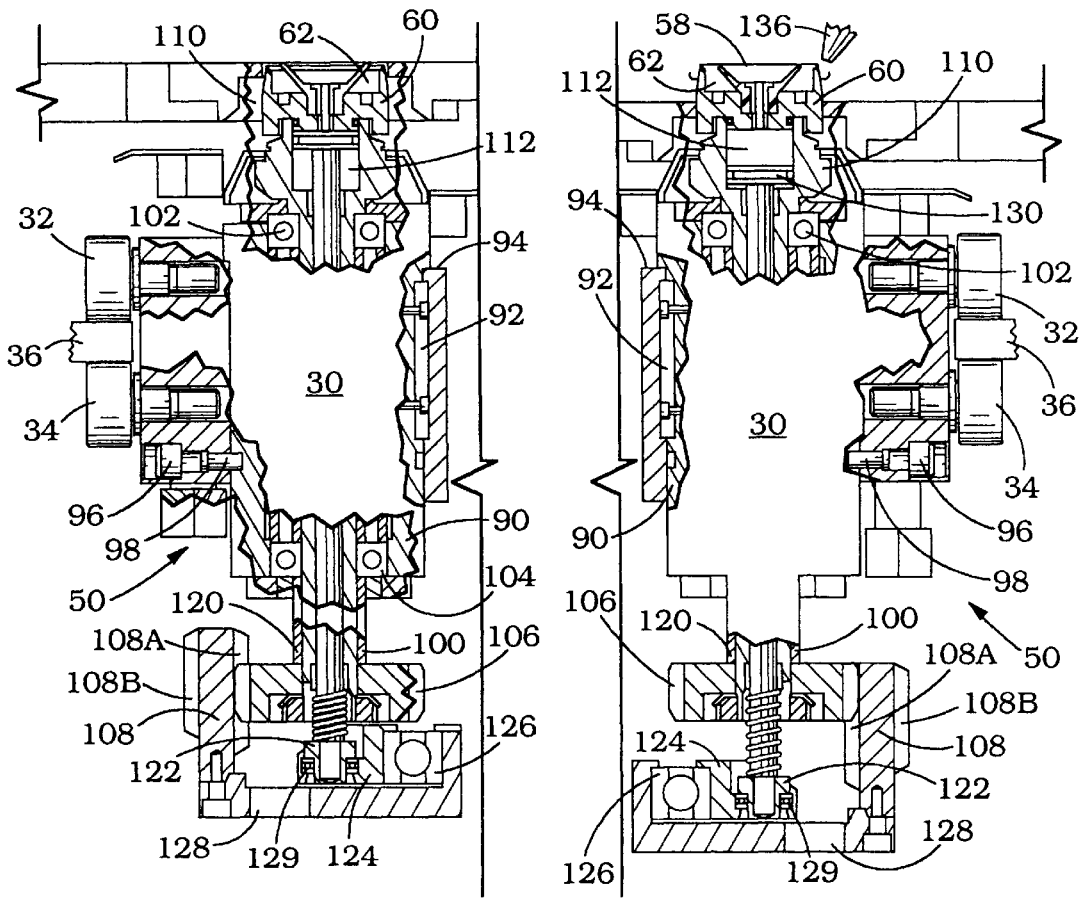
FIG. 3 is an elevational view with parts removed and parts in section of the apparatus of this invention at a location to receive a can lid.
FIG. 3A is an elevational view with parts removed and parts in section of the apparatus of this invention at a location whereat sealant is being applied to a can lid.
Figure 4:
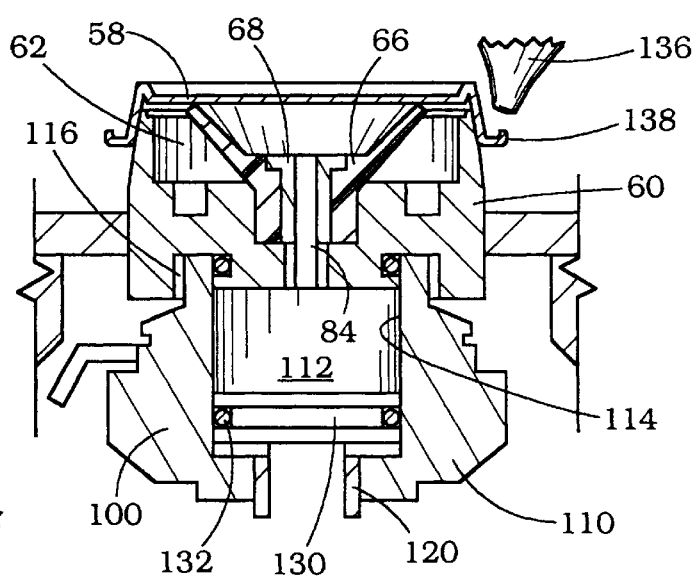
FIG. 4 is an enlarged elevational view of the upper portion of FIG. 3A.

The second part 54 comprises a housing 90 that is removably mounted in each outer casing 30. Rotation between the housing 90 and the outer casing 30 is prevented by a key 92 mounted on the housing 90 and fitting into a slot 94 formed in the outer casing 30. The housing 90 is releasably retained in each outer casing 30 by a set screw 96 fitting into an annular groove 98 in the housing 90. An elongated hollow stem portion 100 is rotatably mounted in the housing 90 by spaced apart bearings 102 and 104. A gear 106 is mounted on one end of the elongated hollow stem portion 100 and is in mesh with a ring gear 108, FIGS. 3 and 3A that is rotated by a separate drive (not shown) and rotates in a direction opposite to the direction of rotation of the main spindle 18. The ring gear 108 has inner teeth 1 08A in mesh with the gear 106 and outer teeth 108B in mesh with a gear on a drive motor (not shown). The gears 106 and 108 rotate the elongated hollow stem portion 100 relative to the housing 90 in the same direction of rotation as the ring gear 108 while the elongated hollow stem portion 100 is rotating with the main spindle 18. In a preferred embodiment of the invention, the main spindle 18 rotates in a counter-clockwise direction and the ring gear 108 and the elongated hollow stem portion 100 rotate in a clockwise direction. An enlarged cylinder head portion 110 is integral with the elongated hollow stem portion 100 and has a recess 112 formed therein having a cylindrical sidewall 114, FIG. 4. The elongated hollow stem portion 100 moves between the lower and upper locations in longitudinal directions substantially parallel to the longitudinal axis of the main spindle 18 with the housing 90 and the outer casing 30. A threaded connection 116, FIG. 4, is used to secure the body portion 60 and the head portion 110 together with the O-ring gasket 80 in sealing engagement with the body portion 60 and the cylindrical sidewall 114.

The third part 56 comprises an elongated rod portion 120. A nut 122 is threaded on one end portion of the elongated rod portion 120 and is used to mount the elongated rod portion 120 in a mounting block 124 mounted on a ring bearing 126 concentric with the ring gear 108 and mounted on a plate 128 on which rotates with the ring gear 108. The ring gear 108 is mounted so that the plate 128 rotates with the ring gear 108. A piston 130, preferably integral with the elongated rod portion 120, is located on the other end of the elongated rod portion 120 and is positioned in the recess 112. An O-ring gasket 132 is seated in an annular groove in the piston 130 and forms a seal between the piston 130 and the cylindrical sidewall 114. The mounting block 124 rotates with the outer casings 30 but does not rotate relative thereto. A thrust bearing 129 is held on the elongated rod 120 by a snap ring 129A and has one race thereof secured to the mounting block 124 and the other race thereof secured to the elongated rod portion 120 so that the elongated rod portion 120 rotates with the elongated hollow stem portion 100 and therefore rotates relative to the main spindle 18. The elongated rod portion 120 is rotated by the frictional force of the O-ring gasket 132 in contact with the cylindrical sidewall 114. A resilient spring 134 surrounds the elongated rod portion 120 and has one end in contact with the elongated hollow stem portion 100 and the other end in contact with the nut 122. The resilient spring 134 functions to keep the nut 122 in a relatively fixed position in a longitudinal direction against the other race of the thrust bearing 129 as the elongated hollow stem portion 100 moves between the lower and upper positions.

In operation, the main drive rotates the main spindle 18 so that the outer casings 30, the housings 90 and the lift chucks 50 rotate with the spindle. As explained above, a separate drive rotates the ring gear 108 that rotates the gear 106 to rotate the elongated hollow stem portion 100 relative to the housing 90. As each lift chuck 50 approaches the location at which a can lid 58 is to be deposited on the flexible member 66, the elongated hollow stem portion 100 and the flexible member 66 are at the lower position 38 as illustrated in FIG. 3. Also, the piston 130 is located adjacent to the bottom of the body portion 60. As the lift chuck 50 reaches the location to have a can lid 58 positioned on a flexible member 66, the rollers 32 and 34 move onto the inclined portion 42 of the cam 36. This causes the outer casing 30 and the first and second parts 52 and 54 of the lift chuck 50 to start to move upwardly toward the upper position. The cylindrical sidewall 114 moves relative to the piston 120 to start forming at least a partial vacuum in the recess 112. After the can lid 58 is deposited on the flexible member 66, and a sealing relationship is established between the can lid 58 and the flexible member 66, as explained below. The partial vacuum in the recess 112 acts through the passageway 84 to exert a pulling force on the can lid 58 to pull the can lid 58 tightly against the annular lip 70 of the flexible member 66. Actually, the partial vacuum functions to permit atmospheric pressure to exert forces on the can lid 58 to force the can lid 58 against the flexible member 66. When the rollers 32 and 34 reach the upper position 40, a sealant applying gun 136, FIG. 4, is activated, as explained below, to apply a sealant (not shown) to the outer rim portion 138 of the can lid 58. As the rollers 32 and 34 move over the inclined portion 44, the can lid 58 with the sealant deposited thereon moves over the discharge track means 22 to be removed from the flexible member 66. As the rollers 32 and 34 move over the inclined portion 44, the cylindrical sidewall 114 moves relative to the piston 120 so that there is no longer a vacuum in the recess 112. As illustrated in FIG. 9, each inclined portion 42 and 44 has a circumferential extent of about 35° and the upper portion 40 of the cam 36 has a circumferential extent of about 125°. The distance between the lower portion 38 and the upper portion 40 is about 0.625 inch. The flexible member 66 is rotated at a speed that provides for at least two complete revolutions of the can lid 58 when the sealant is being applied by the sealant applying gun 136.

Figure 2:
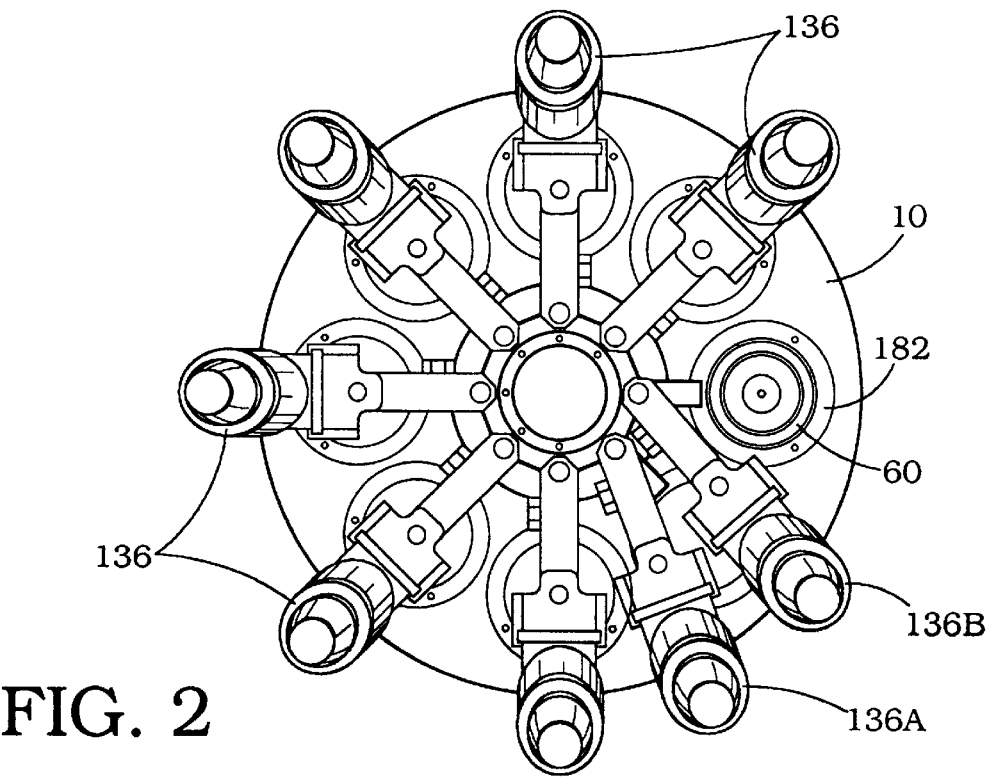
FIG. 2 is a top plan view with parts removed of the apparatus of this invention.
Figure 5:
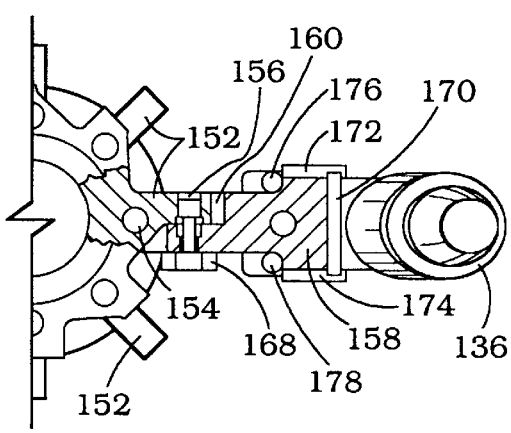
FIG. 5 is a top plan view with parts in section of the pivotal mounting of one of the sealant applying guns.
Figure 6:
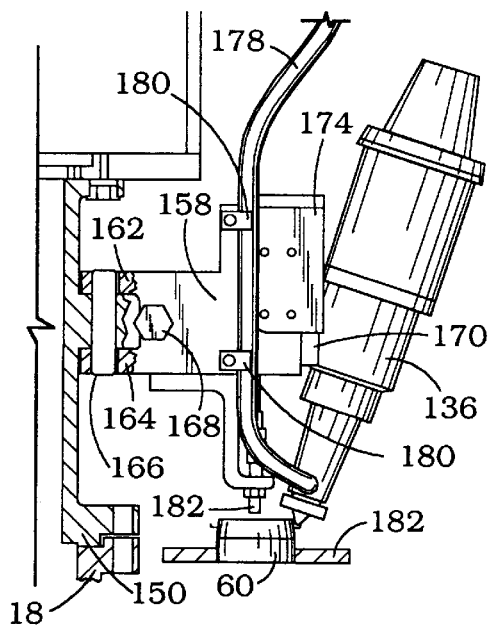
FIG. 6 is an elevational view of FIG. 5.

The mounting of the sealant applying guns 136 is illustrated in FIGS. 2, 5 and 6. A support member 150 for each sealant applying gun 136 is mounted on the main spindle 18 for rotation therewith. A support arm 152 projects radially outwardly from the support member 150 and has a first opening 154 formed therein which opening has a longitudinal axis extending in a direction parallel to the longitudinal axis of the main spindle 18 and a second threaded opening 156 for purposes described below. A mounting block 158 is provided and has a recess 160 formed therein for reception of a portion of the support arm 152. An upper portion 162 of the mounting block 158 is located above the recess 160 and a lower portion 164 of the mounting block 158 is located above the recess, each has an opening formed therein which openings are aligned with the first opening 154 so that a pivot pin 166 can be positioned in the aligned openings so that the mounting block 158 is pivotally mounted on the support arm 152. A threaded bolt 168 extends through a portion of the mounting block 158 and is threaded into the second opening 156 to hold the mounting block 158 and therefore the sealant applying gun 136 in an operative position, as illustrated in FIG. 4, to apply sealant to the outer rim portion 138 of the can lid 58.

The mounting of each sealant applying gun 136 on the mounting block 158 is illustrated in FIGS. 5 and 6. A mounting plate 170 is attached to each of the sealant applying guns 136. The mounting plate 170 is securely mounted on the mounting block 158 using opposite clamping plates 172 and 174 having grooves in which the mounting plate 170 is located and wherein each clamping plate 172 and 174 is secured to the mounting block 158 by a=suitable means such as threaded bolts. Sealant supplying tubes 176 and 178 are mounted on the mounting block 158 using clamping clips 180. A proximity sensor 182 is mounted on the mounting block 158 and functions to sense the presence of a can lid 58 to start the flow of a sealant from the sealant applying gun 136 and after a period of time to stop the flow of the sealant.

The pivotal mounting of the sealant applying guns 136 permits the easy removal of a lift chuck 50 for maintenance. In the embodiment the invention illustrated in FIG. 2, two sealant applying guns 136 are pivoted to an inoperative position. However, in some instances, only one sealant applying gun 136 has to be moved to the inoperative position. The operation to remove a lift chuck 50 is illustrated in FIGS. 2 and 7. The threaded bolt 168 of a first sealant applying gun 136A is loosened and the first sealant applying gun 136A is pivoted to the inoperative position. The threaded bolt 168 of a second sealant applying gun 136B is loosened and the second sealant applying gun 136B is moved to the inoperative position to expose a lift chuck 50. A closure plate 182 is removed from the rotatable support wheel means 14 and the set screw 96, FIG. 3A, is loosened. A suitable tool (not shown) is used to grasp the body portion 60 and pull the lift chuck 50 out of the outer casing 30. The various parts of the lift chuck 50 may then be disassembled.

Figure 10:
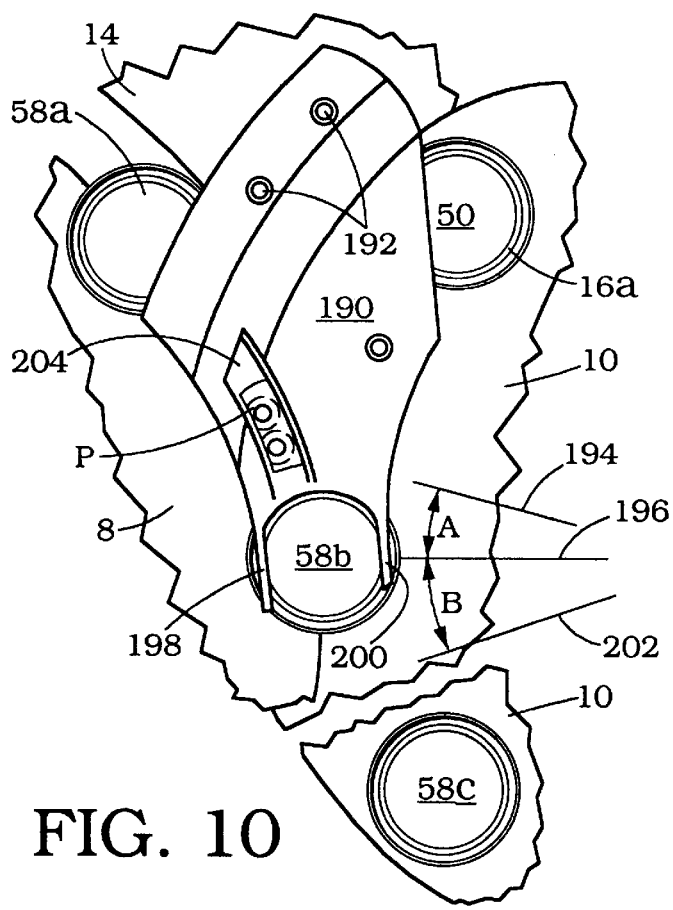
FIG. 10 is a schematic top plan view illustrating the movement of a can lid from a star wheel to the sealant applying position.
Figure 11:
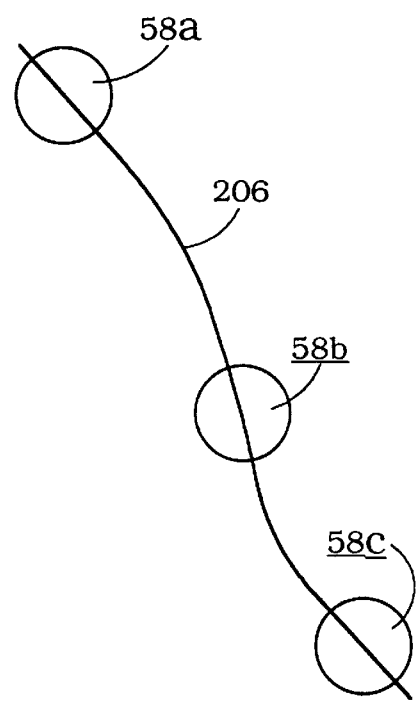
FIG. 11 is an illustration of the path of movement of the can lid.
Figure 12:
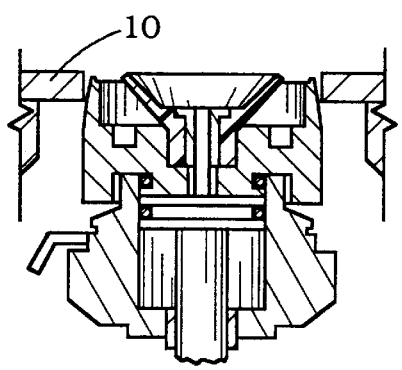
FIGS. 12–14 illustrate the relative movements of the lift chuck.
Figure 13:
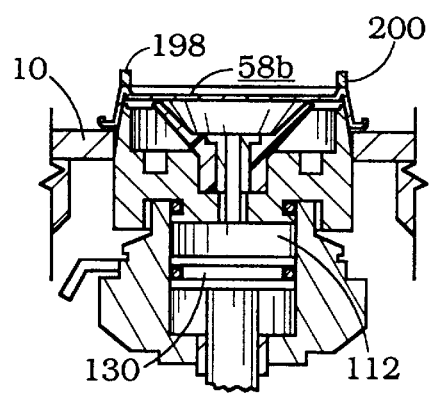
Figure 14:
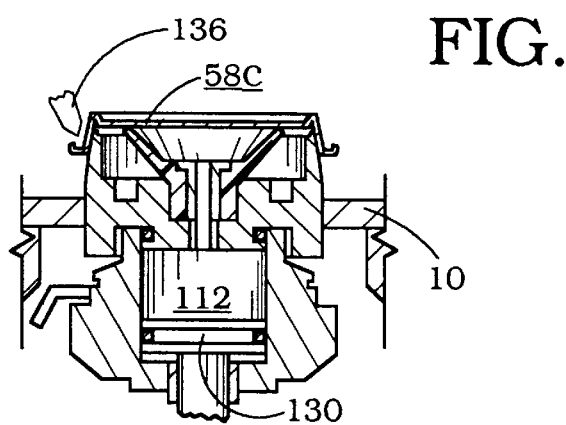

The operation of the invention is further explained in relation to the illustrations in FIGS. 10–14. A first can lid 58a has been removed from the supply 6 and is being moved by the rotating star wheel 8 toward the rotating table 10. The guide means 14 is cooperating with the star wheel 8. The first can lid 58a is entering beneath another guide apparatus 190 which is secured to the guide means 14 by threaded bolts 192. A first opening 16a in the rotating table 10 is also moving under the guide apparatus 190. A lift chuck 50 is positioned beneath the opening 16a and is illustrated in FIG. 12. At about line 194 of FIG. 10, the cam rollers 32 and 34 contact the inclined portion 42 and start to move the lift chuck 50 toward the upper position 40. At about line 196, the flexible member 66 has moved into contact with a can lid 58b. The angle A between the lines 194 and 196 is about 13.0 degrees. Two portions 198 and 200 of the guide apparatus 190 are in contact with portions of the can lid 58b to prevent upward movement of the can lid 58b as pressure is applied thereto by the flexible member 66 so that an effective seal is formed between the flexible member 66 and the can lid 58b. As illustrated in FIG. 13, the piston 130 has moved away from the body member 60 to start forming the partial vacuum in the recess 112 so that atmospheric pressure is now forcing the can lid 58b against the flexible member 66. When the can lid 58b reaches the line 202, the piston 130 is at the bottom of the recess 112 so that the greatest vacuum has now been formed in the recess 112. The angle B between the lines 196 and 202 is about 22 degrees. A conventional pusher P for the can lid 58 in the star wheel 8 is also illustrated in FIG. 10 and moves through a recess 204 in the guide apparatus 190. The can lid 58c illustrated in FIGS. 10 and 14 is in the sealant applying section and the sealant applying gun 136 is applying sealant. The path 206 of the can lids 58a; 58b and 58c is illustrated in FIG. 11.

The apparatus of this invention has been illustrated in relation to sealant applying apparatus for can lids 58 for a beverage holding can wherein the can lid 58 is identified as that for a 202 can and the rim portion thereof has a diameter of about 2.337 inches. In the apparatus illustrated in the drawings, the star wheel has eight can holding recesses and the sealant applying apparatus has eight openings, lift chucks, and sealant applying guns. It is understood that sealant applying apparatus for different sizes of can lids will have different sizes of the various parts of the illustrated apparatus.

It is contemplated that the inventive concepts herein described may be variously otherwise embodied and it is intended that the appended claims be constructed to include alternative embodiments of the invention except insofar as limited by the prior art.

What is claimed:

1. In apparatus wherein a plurality of sealant applying guns are mounted on a rotatable spindle and are controlled to apply sealant to an annular outer rim of a can lid during a portion of each complete revolution of the rotatable spindle and wherein a plurality of lift chucks are mounted on the rotatable spindle for rotation therewith and wherein each lift chuck is rotated relative to the rotatable spindle while the rotatable spindle is rotating and wherein the apparatus includes mechanisms for raising and lowering each lift chuck in longitudinal directions as the spindle rotates and wherein each can lid is, in a continuous operation, deposited on one of the plurality of rotating lift chucks, the improvement comprising:

at least a partial vacuum forming apparatus comprising at least parts of each of said lift chucks for holding a can lid at a desired location relative to a sealant applying gun so that said sealant applying gun can apply sealant to said can lid.

2. Apparatus as in claim 1 wherein the apparatus includes mechanisms for raising and lowering each lift chuck as the spindle rotates and wherein the vacuum forming apparatus comprises:

a piston and a cylinder; and said raising and lowering mechanisms producing relative movement between said piston and cylinder.

3. Apparatus as in claim 2 wherein said vacuum forming apparatus further comprises:

first sealing apparatus between said piston and said cylinder; and second sealing apparatus between said cylinder and said can lid on said lift chuck.

4. Apparatus as in claim 2 wherein:

said piston and said cylinder rotate with said lift chuck;

said piston is stationary in a longitudinal direction; and said cylinder being moved in longitudinal directions by said raising and lowering mechanisms.

5. Apparatus as in claim 2 and further comprising:

resilient apparatus between said piston and said cylinder holding said piston against a relatively fixed object.

6. Apparatus as in claim 5 wherein said vacuum forming apparatus further comprises:

first sealing apparatus between said piston and said cylinder; and second sealing apparatus between said cylinder and said can lid on said lift chuck.

7. Apparatus as in claim 3 and further comprising:

said cylinder having an open end portion;

can lid supporting apparatus mounted on said open end portion;

said can lid supporting apparatus having an opening extending therethrough and having one end in fluid communication with said cylinder; and said can lid when supported on said can lid supporting apparatus closing the other end of said opening.

8. Apparatus as in claim 7 and further comprising said can lid supporting apparatus having an open recess formed therein;

an annular rim portion of said can lid supporting apparatus surrounding said recess and having an exposed supporting surface;

a flexible member mounted in said recess and having an opening formed therein;

said opening being in fluid communication with said opening formed in said can lid supporting apparatus so that said opening in said flexible member is in fluid communication with said cylinder; and a portion of said flexible member extending through a plane defined by said exposed supporting surface;

guide apparatus mounted at a fixed location to limit movement of said can lid when said flexible member is moved into contact with said can lid so that an effective seal is formed therebetween so that, when said piston and said cylinder form said vacuum, said can lid will move into contact with said exposed supporting surface while said sealant is applied thereto.

9. Apparatus as in claim 8 wherein:

said flexible member has an annular surface in contact with said can lid.

10. Apparatus as in claim 8 wherein said vacuum forming apparatus further comprises:

first sealing apparatus between said piston and said cylinder; and second sealing means between said cylinder and said can lid supporting apparatus.

11. Apparatus as in claim 8 wherein:

said piston is stationary in a longitudinal direction; and said cylinder being moved in longitudinal directions by said raising and lowering mechanism.

12. Apparatus as in claim 11 and further comprising:

resilient apparatus between said piston and said cylinder holding said piston against a relatively fixed object.

13. Apparatus as in claim 1 wherein:

each of said sealant applying guns is pivotally mounted on said rotatable spindle to permit pivotal movement of each of said sealant applying guns between operative and inoperative locations.

14. Apparatus as in claim 13 wherein:

each of said lift chucks is mounted on said rotatable spindle;

each of said sealant applying guns preventing removal of each of said lift chucks when in said operative location; and each of said sealant applying guns permitting removal of each of said lift chucks when in said inoperative location.

15. Apparatus as in claim 14 and further comprising:

mounting apparatus for removably mounting each of said lift chucks comprising:

said rotatable spindle having a plurality of longitudinally extending spaced apart hollow outer casings mounted thereon;

a removable housing mounted in each of said hollow outer casings for movement with said spindle;

a hollow shaft having a cylinder formed at one end thereof rotatably mounted in said removable housing;

an elongated rod mounted in said hollow elongated shaft and having a piston formed at one end thereof;

said piston being located in said cylinder; and said removable housing having an outer surface having an annular recess formed therein; and a set screw mounted in said outer casing and extending into said annular recess to prevent longitudinal movement of said housing relative to said spindle, so that said housing, said hollow shaft and said elongated shaft may be removed by pivoting at least one of said sealant applying guns to said inoperative position, removing said cover plate and removing said set screw from said annular recess.

16. In apparatus wherein a plurality of sealant applying guns are mounted on a rotatable spindle and are controlled to apply sealant to an annular outer rim of a can lid during a portion of each complete revolution of the rotatable spindle and wherein a plurality of lift chucks are mounted on the rotatable spindle for rotation therewith and wherein each lift chuck is rotated relative to the rotatable spindle while the rotatable spindle is rotating and wherein each can lid is, in a continuous operation, deposited on one of the plurality of lift chucks, a method comprising:

forming at least a partial vacuum in said one of said plurality of lift chucks;

using at least parts of said one of said plurality of lift chucks to form said at least a partial vacuum; and exposing said can lid on said one of said plurality of lift chucks to said at least a partial vacuum to hold said can lid on said one of said plurality of lift chucks while sealant is applied thereto.

17. A method as in claim 16 and further comprising;

providing one end of said one of said plurality of lift chucks with a recess formed by a cylindrical sidewall;

mounting a piston in said recess in sealing engagement with said cylindrical sidewall;

mounting a can lid supporting apparatus on said one end with said can lid supporting apparatus having a passageway extending therethrough and in fluid communication with said recess;

depositing said can lid on said can lid supporting apparatus forming an effective seal between said can lid and said can lid supporting apparatus;

causing relative movement between said recess and said piston to form said at least a partial vacuum in said recess; and holding said can lid on said can lid supporting apparatus by forces resulting from said at least a partial vacuum.

18. A method as in claim 17 and further comprising:

moving said recess while holding said piston stationary to form said at least a partial vacuum.

19. A method as in claim 18 and further comprising:

applying a resilient force on said piston while said recess is moving to hold said piston stationary.

20. In apparatus wherein a plurality of sealant applying guns are mounted on a rotatable spindle and are controlled to apply sealant to a circular outer rim of a can lid during a portion of each complete revolution of the rotatable spindle and wherein a plurality of lift chucks are mounted on the rotatable spindle for rotation therewith and wherein each lift chuck is rotated relative to the rotatable spindle while the rotatable spindle is rotating and wherein each can lid is, in a continuous operation, deposited on one of the plurality of lift chucks, a method comprising:

pivotally mounting said sealant applying guns on said rotatable spindle for movement between an operative location above said lift chuck and an inoperative location laterally spaced from said lift chuck to expose and permit removal of said lift chuck;

moving at least one of said sealant applying guns to said inoperative location; and removing said exposed lift chuck.

* * * * *